May 13, 1958

W. A. JONES ET AL 2,834,209

GYROSCOPIC FLOWMETER

Filed Oct. 6, 1954

2 Sheets-Sheet 1

INVENTORS
GEORGE S. CHERNIAK
WILLIAM A. JONES

BY Kenway, Jenney, Witter & Hildreth

ATTORNEYS

May 13, 1958  W. A. JONES ET AL  2,834,209
GYROSCOPIC FLOWMETER

Filed Oct. 6, 1954  2 Sheets-Sheet 2

INVENTORS
GEORGE S. CHERNIAK
BY WILLIAM A. JONES

Kenway, Jenney, Witter & Hildreth
ATTORNEYS

United States Patent Office 2,834,209
Patented May 13, 1958

2,834,209

GYROSCOPIC FLOWMETER

William A. Jones, Newtonville, and George S. Cherniak, Newton, Mass., assignors, by mesne assignments, to American Radiator & Standard Sanitary Corporation, New York, N. Y., a corporation of Delaware Application October 6, 1954, Serial No. 460,640

8 Claims. (Cl. 73—194)

This application is a continuation-in-part of our copending application Ser. No. 380,414 filed September 16, 1953, now abandoned, and more particularly relates to an improvement of the mass flowmeter disclosed in the patent to Pearson No. 2,624,198 issued January 6, 1953.

Flowmeters of the type with which this invention is concerned consist in essence of a curved conduit through which a fluid may be flowed and caused to have an angular momentum imparted to it. The conduit is mounted for angular motion on an axis perpendicular to an axis about which there exists at least a component of the angular momentum of the flowing fluid, and there is accordingly developed a gyroscopic couple which is directly proportional to the mass rate of flow of the fluid.

The present invention provides a new and improved means for measuring this gyroscopic couple which greatly increases the sensitivity and accuracy of the meter, and which is not susceptible to spurious readings from such effects as instantaneous changes in the density of the fluid and mechanically induced vibrations.

Another object of our invention is to obtain a continuous, non-oscillatory measurement of mass flow rate.

In the accomplishment of these and other objects, we provide as one important feature of our invention flexible mounting means for the curved conduit permitting deflection about a rotating torque axis when fluid is passed therethrough. This axis at all times remains perpendicular to both the axis about which there exists angular momentum of the fluid and the axis of angular movement of the conduit.

Another important feature of this invention is the provision of measuring means responsive to the deflection of the conduit about the torque axis to indicate the angular deflection of the conduit, said measurement being directly proportional to the gyroscopic couple exerted about that axis.

Figure 1:
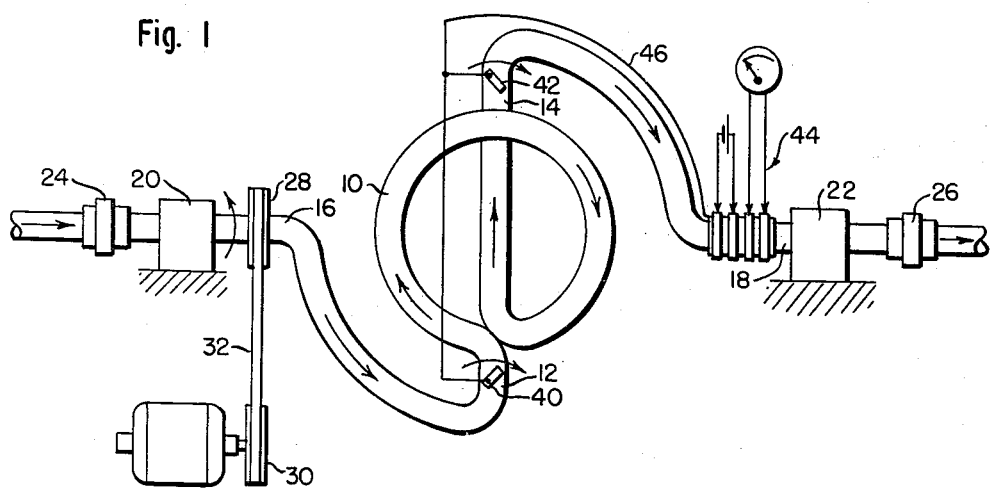
Figure 2:
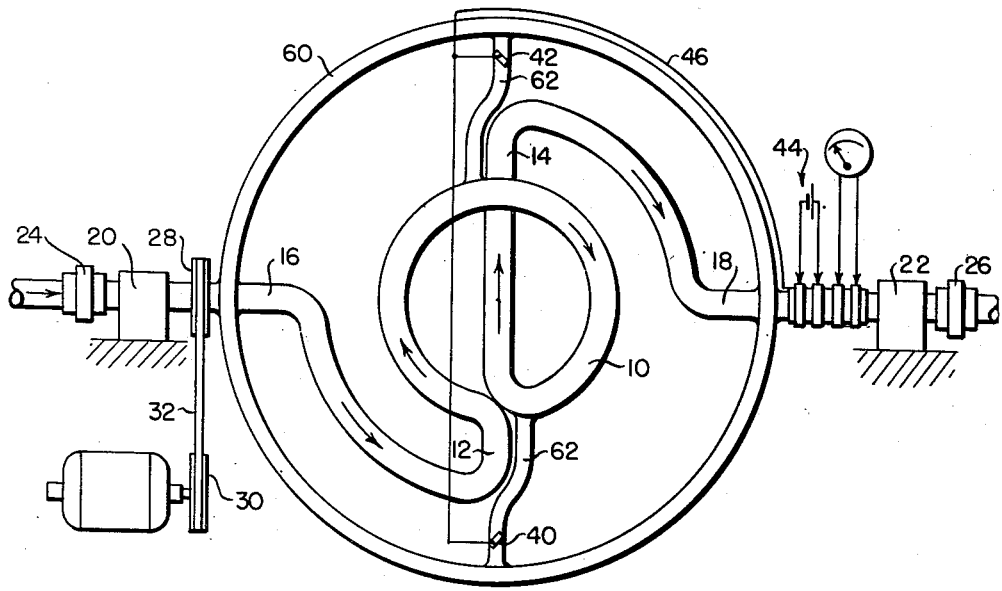
Figure 3:
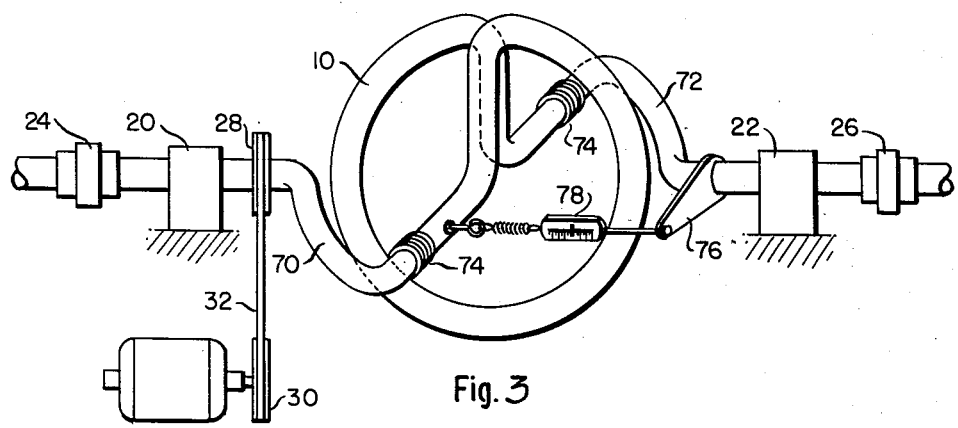
Figure 4:
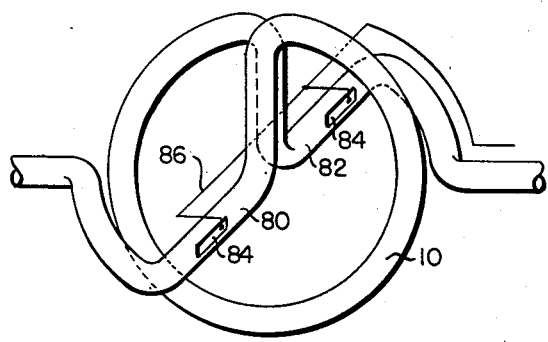

These and other objects and features of this invention will be better understood and appreciated by a reading of the following detailed description of a number of embodiments thereof, selected for purposes of illustration and shown in the accompanying drawing in which:

Fig. 1 is a diagrammatic view in front elevation of a mass flowmeter constructed in accordance with this invention, Fig. 2 is a view in front elevation of another embodiment of a mass flowmeter constructed in accordance with this invention, Fig. 3 is a view in front elevation of another embodiment of a mass flowmeter constructed in accordance with this invention, and Fig. 4 is a fragmentary view of still another flowmeter constructed in accordance with this invention.

The preferred embodiment of our invention illustrated in Fig. 1 is organized about a curved conduit or coil 10. Though the drawing illustrates merely one turn of conduit, it is deemed obvious that any number of turns may be employed, each additional turn giving rise to greater angular momentum in the operation of our device. Projecting from the coil 10 are coil inlet and outlet passages 12 and 14, each passage connected at its opposite end to inlet and outlet conduits 16 and 18 respectively. It is important to note in this embodiment that the passages 12 and 14 lie along an axis perpendicular to the axis of the coil 10, while the conduits 16 and 18 are disposed along an axis perpendicular to the axes of the coil and the passages.

A pair of rigid mounting blocks 20 and 22 serve to rotatably support the conduits 16 and 18, thereby supporting the coil 10 for rotation about the axis of said conduits. Disposed on the extreme ends of conduits 16 and 18 are fluid tight slip couplings 24 and 26 affording means for connecting the rotating conduits to stationary fluid supply and discharge conduits.

To rotate the coil 10 about the axis of the conduits 16 and 18, a pulley 28 secured to the conduit 16 is connected to the motor driven pulley 30 by means of a belt 32.

In constructing the device thus far described, the conduit 16, the passage 12, the coil 10, the passage 14 and the conduit 18 may be integrally formed. However, this is not necessary. It is only required that the support means for the coil 10 be relatively elastic to permit some deflection of the coil about an axis perpendicular to the axis of rotation of the coil and the axis of said coil. In the illustrated embodiment, inlet and outlet passages 12 and 14 are made of a material that is relatively elastic to permit some twisting about their axis, for reasons hereinafter described.

In operation, the slip couplings 24 and 26 connect the conduits 16 and 18 in the line of the fluid to be measured. The fluid entering conduit 16 will pass through the passage 12, the coil 10, the passage 14 and out through the conduit 18 in the direction indicated by the arrows. The flow of the fluid through coil 10 will create an angular momentum about the axis of the coil in the same manner as a rotating fly wheel in the conventional gyroscope. Upon energization of the motor, the coil will rotate at a constant rate about the axis of the conduits 16 and 18, perpendicular to the axis of the coil 10. The angular movement of the coil and the angular momentum of the fluid cooperate to produce a couple under well known gyroscopic principles about a third axis perpendicular to the axis of the angular movement of said coil and the angular momentum of the fluid. This third axis is coaxial with the axis of inlet and outlet passages 12 and 14. The couple so produced will manifest itself in a twisting of the relatively elastic passages 12 and 14 about their axes.

To measure the torsion exerted on passages 12 and 14, direct current torque measuring instruments 40, 42 such as a pair of strain gauges may be fixed to the passages in the conventional manner. A slip ring and brush pick-off assembly as illustrated at 44 may be connected by means of leads 46 to the strain gauges. The assembly 44 is mounted on the outlet conduit 18, and may be connected through an amplifier (not shown) to a meter for recording the torque. This ancillary equipment obviously may be direct current apparatus. One such circuit is described and illustrated in Electric Resistance Strain Gauges, page 18, by Dobie & Issac, English Univ. Press Ltd., London. It will be demonstrated in the following mathematical derivation that the torque exerted about the axis of passages 12 and 14 is a function of the mass flow rate of the fluid moving through the coil 10.

(1) $$V = 2\pi r A \text{ ft.}^3$$

where V is the volume of the coil, r is the radius of the coil, and A is the cross sectional area of the coil.

(2) $$M = V\rho = 2\pi r A \rho \text{ slugs}$$

where M is the mass of the fluid in the coil and $\rho$ is the mass density of the fluid.

(3) $$\omega = 2\pi \frac{W}{M} = \frac{W}{Ar\rho} \text{ radians per sec.}$$

where $\omega$ is the angular velocity of the fluid particle in the coil and $W$ is the mass flow rate of the fluid in the coil.

(4) $$I = Mr^2 = 2\pi Ar^3\rho \text{ slugs ft.}^2$$

where $I$ is the moment of inertia of fluid mass in the coil about the coil axis perpendicular to the coil plane.

(5) $$H = I\omega = 2\pi Ar^3\rho \left(\frac{W}{Ar\rho}\right) = 2\pi r^2 W \text{ lbs. ft. sec.}$$

where $H$ is the angular momentum of the fluid annulus.

(6) $$T = H\Omega = 2\pi r^2 \Omega W \text{ ft. lbs.}$$

where $T$ is the output torque and $\Omega$ is the precessional velocity in radians per sec.

From the preceding derivation it becomes apparent that the torque measured by the strain gauges is a function of the mass flow rate or $W$. The other factors in the equation being constant, it is only necessary to select a meter of suitable sensitivity to permit direct reading of the mass flow rate.

The embodiment of this invention illustrated in Fig. 2 is like that shown in Fig. 1 and like numerals refer to identical elements in each of the configurations. The coil 10 and its inlet and outlet passages 12, 14, 16, and 18 are each assembled to the same manner as previously described; hence, no detailed description thereof is considered necessary. A new means of measuring the torque exerted about the axis of conduits 12 and 14 has been incorporated into the otherwise identical structure and it will be described in detail.

A gimbal 60 is observed to be mounted on the passages 16 and 18 and rotates with the coil under the influence of the motor. A pair of torque bars 62 are rigidly secured at their ends to the gimbal 60 and the coil 10 and carry the strain gauges 40 and 42 to respond to the twisting of the coil under the influence of the gyroscopic couples. The radially outward portions of the torque bars 62 are observed to be coaxial with the passages 12 and 14 and will deflect with coil displacement about their axis. Obviously the distortion of the bars measured by the strain gauge and indicated at the meter electrically connected thereto through the strain gauge assembly 46 will be a measure of the mass flow rate of the fluid passing through the coil.

The apparatus disclosed in Fig. 3 is another configuration of a flowmeter constructed in accordance with this invention. The means employed to establish a fixed torque axis and to measure the force exerted about it by the gyroscopic couple have been modified slightly. In detail, the coil 10 is carried by a pair of passages 70 and 72 to direct fluid into and out of the coil, respectively. Each of the passages is interrupted by a bellows 74 which permits deflection of the coil about an axis perpendicular to the axis of rotation of the coil and coil axis. The bellows 74 and the passages or pipes 70 and 72 together form a duct to lead fluid through the coil 10.

Although the portions of the conduits 70 and 72 containing the bellows are illustrated as being coincident with the coil axis, it will be apparent that they need not be confined to that particular location. It is only necessary that the bellows 74 permit twisting of the coil 10 about an axis perpendicular to the axis of rotation of the coil and the coil axis.

A relatively simple means for determining the torque or twisting force exerted by the gyroscopic couple about the torque axis established by the bellows is illustrated. A spring scale 78 connected at one end to an arm 76 carried by the outlet conduit 72 is secured at its other end to the inlet conduit, 70. It is to be noted that the connection of the spring scale to the passage 70 is made at a fixed location displaced a determinable distance from the torque axis so that the force measured by the scale is directly proportional to the twisting force. Obviously this force is a function of the mass flow rate of the fluid flowing throught the coil.

It is appreciated that some difficulty may be encountered in reading the scale 78 when the coil 10 rotates at a high angular velocity. However, this difficulty may be overcome by the use of stroboscopic light.

In the embodiment shown in Fig. 4 an inlet and an outlet passage 80 and 82 are disposed in the same position relative to the coil 10 as the passages 70 and 72 in the previously described embodiment of this invention. However, the bellows 74 have been eliminated and the relatively flexible tubing of the type used in the embodiment of Fig. 1 has been substituted.

Instead of measuring the force exerted by the gyroscopic couple about the torque axis, the bending moment exerted on the conduits 80 and 82 is measured by a pair of appropriately positioned strain gauges 84 mounted on said conduits. The conductor 86 diagrammatically illustrates the leads necessary to provide an electrical connection to a meter (not shown). Obviously, the bending moment exerted on the conduits is a function of the mass flow rate of fluid passing through the coil.

Having thus described each of the embodiments illustrated, it will be apparent that in each the coil may displace about a torque axis under the influence of the gyroscopic couple produced by the angular movement of the coil and the angular momentum of the fluid, and that a measurement of the deflection provides an indication of the mass rate of flow of a fluid flowing through the coil.

From an appreciation of the foregoing description, numerous modifications of this invention will obviously occur to one skilled in the art. For example, although the description has been restricted to a gyroscopic flowmeter employing constant speed motors, thereby maintaining the $\omega$ factor constant in the operative equation, it is apparent that a constant factor $\omega$ is unnecessary. The measured deflection of the curved conduit remains a function of the mass flow rate regardless of the angular speed of the coil. If the angular velocity varies, to obtain an instantaneous weight rate of flow measurement, it is only necessary to measure the angular velocity and perform a simple mathematic division with the measured deflection. It is our intention, therefore, that the scope of this invention be limited not by the above specification, but only by the appended claims.

Having thus described this invention, what we claim as new and desire to secure by Letters Patent of the United States is:

1. A flowmeter comprising a curved conduit through which fluid to be measured flows whereby an angular momentum is developed by said fluid, means forming inlet and outlet passages communicating with said curved conduit axially aligned and establishing a drive axis perpendicular to an axis about which there exists at least a component of said angular momentum whereby a gyroscopic couple is developed by said fluid when said curved conduit is rotated about said drive axis, means for continuously rotating said curved conduit unidirectionally about said drive axis, flexible conduit portions connecting the ends of said curved conduit respectively with said means forming inlet and outlet passages, each of said conduit portions being coaxial with an axis passing through the intersection of said above-named axes and substantially perpendicular to said drive axis, whereby said gyroscopic couple constantly deflects said curved conduit about the axis of said conduit portions by an amount responsive to the mass rate of fluid flow through said curved conduit at any given instant, and means responsive to the amount of such deflection for indicating said mass rate of flow.

2. A flowmeter comprising a curved conduit through which fluid to be measured flows whereby an angular momentum is developed by said fluid, means forming inlet and outlet passages communicating with said curved conduit axially aligned and establishing a drive axis perpendicular to an axis about which there exists at least a component of said angular momentum whereby a gyroscopic couple is developed by said fluid about a third axis perpendicular to said drive axis when said curved conduit is rotated about said drive axis, means for continuously rotating said curved conduit unidirectionally about said drive axis, flexible conduit portions connecting the ends of said curved conduit respectively with said means forming inlet and outlet passages, said conduit portions being aligned with each other coaxially with said third axis, whereby said gyroscopic couple constantly deflects said curved conduit about the axis of said conduit portions by an amount responsive to the mass rate of fluid flow through said curved conduit at any given instant, and means responsive to the amount of such deflection for indicating said mass rate of flow.

3. A flowmeter comprising a curved conduit defining a loop through which fluid to be measured flows whereby an angular momentum is developed by said fluid, means forming inlet and outlet passages communicating with said curved conduit axially aligned and establishing a drive axis perpendicular to an axis about which there exists at least a component of said angular momentum whereby a gyroscopic couple is developed by said fluid when said curved conduit is rotated about said drive axis, means for continuously rotating said curved conduit unidirectionally about said drive axis, flexible conduit portions connecting the ends of said curved conduit respectively with said means forming inlet and outlet passages, each of said conduit portions being coaxial with an axis passing through the intersection of said above-named axes and substantially perpendicular to said drive axis, whereby said gyroscopic couple constantly deflects said curved conduit about the axis of said conduit portions by an amount responsive to the mass rate of fluid flow through said curved conduit at any given instant, and means responsive to the amount of such deflection for indicating said mass rate of flow.

4. A flowmeter comprising a curved conduit defining a loop through which fluid to be measured flows whereby an angular momentum is developed by said fluid, means forming inlet and outlet passages communicating with said curved conduit axially aligned and establishing a drive axis perpendicular to the axis of said loop whereby a gyroscopic couple is developed by said fluid about a third axis perpendicular to said drive axis and to the axis of said loop when said curved conduit is rotated about said drive axis, means for continuously rotating said curved conduit unidirectionally about said drive axis, flexible conduit portions connecting the ends of said curved conduit respectively with said means forming inlet and outlet passages, said conduit portions being aligned with each other coaxially with said third axis, whereby said gyroscopic couple constantly deflects said curved conduit about the axis of said conduit portions by an amount responsive to the mass rate of fluid flow through said curved conduit at any given instant, and means responsive to the amount of such deflection for indicating said mass rate of flow.

5. A flowmeter comprising a curved conduit through which fluid to be measured flows whereby an angular momentum is developed by said fluid, means forming inlet and outlet passages communicating with said curved conduit axially aligned and establishing a drive axis perpendicular to an axis about which there exists at least a component of said angular momentum whereby a gyroscopic couple is developed by said fluid when said curved conduit is rotated about said drive axis, flexible conduit portions connecting the ends of said curved conduit respectively with said means forming inlet and outlet passages, said conduit portions being aligned with each other coaxially with an axis passing through the intersection of said above-named axes and substantially perpendicular to said drive axis and resiliently permitting continuous deflection of said curved conduit in response to said gyroscopic couple, means for continuously rotating said curved conduit about said drive axis at constant speed, and means responsive to said deflection indicating the mass rate of flow through said curved conduit.

6. A flowmeter comprising a curved conduit through which fluid to be measured flows whereby an angular momentum is developed by said fluid, means forming inlet and outlet passages communicating with said curved conduit axially aligned and establishing a drive axis perpendicular to an axis about which there exists at least a component of said angular momentum whereby a gyroscopic couple is developed by said fluid about a third axis perpendicular to said drive axis when said curved conduit is rotated about said drive axis, flexible conduit portions connecting the ends of said curved conduit respectively with said means forming inlet and outlet passages, said conduit portions being aligned with each other coaxially with said third axis and resiliently permitting continuous deflection of said curved conduit in response to said gyroscopic couple, means for rotating said curved conduit about said drive axis, at constant speed, and means responsive to said deflection indicating the mass rate of flow through said curved conduit.

7. A flowmeter comprising a curved conduit defining a loop through which fluid to be measured flows whereby an angular momentum is developed by said fluid, means forming inlet and outlet passages communicating with said curved conduit axially aligned and establishing a drive axis perpendicular to an axis about which there exists at least a component of said angular momentum whereby a gyroscopic couple is developed by said fluid when said curved conduit is rotated about said drive axis, flexible conduit portions connecting the ends of said curved conduit respectively with said means forming inlet and outlet passages, said conduit portions being aligned with each other coaxially with an axis passing through the intersection of said above-named axes and substantially perpendicular to said drive axis and resiliently permitting continuous deflection of said curved conduit in response to said gyroscopic couple, means for rotating said curved conduit about said drive axis at constant speed, and means responsive to said deflection indicating the mass rate of flow through said curved conduit.

8. A flowmeter comprising a curved conduit defining a loop through which fluid to be measured flows whereby an angular momentum is developed by said fluid, means forming inlet and outlet passages communicating with said curved conduit axially aligned and establishing a drive axis perpendicular to the axis of said loop whereby a gyroscopic couple is developed by said fluid about a third axis perpendicular to said drive axis and to the axis of said loop when said curved conduit is rotated about said drive axis, flexible conduit portions connecting the ends of said curved conduit respectively with said means forming inlet and outlet passages, said conduit portions being aligned with each other coaxially with said third axis and resiliently permitting continuous deflection of said curved conduit in response to said gyroscopic couple, means for rotating said curved conduit about said drive axis at constant speed, and means responsive to said deflection indicating the mass rate of flow through said curved conduit.

References Cited in the file of this patent
UNITED STATES PATENTS
2,624,198    Pearson _____ Jan. 6, 1953